United States Patent
Staver et al.

(10) Patent No.: US 10,959,437 B2
(45) Date of Patent: Mar. 30, 2021

(54) CONVEYOR OVEN

(71) Applicant: Wolfe Electric, Inc., Wichita, KS (US)

(72) Inventors: Brent W. Staver, Maize, KS (US); Timothy P. Gile, Wichita, KS (US)

(73) Assignee: Wolfe Electric, Inc., Wichita, KS (US)

( * ) Notice: Subject to any disclaimer, the term of this patent is extended or adjusted under 35 U.S.C. 154(b) by 93 days.

(21) Appl. No.: 16/400,559

(22) Filed: May 1, 2019

(65) Prior Publication Data

US 2019/0254289 A1 Aug. 22, 2019

(51) Int. Cl.
*A21B 3/02* (2006.01)
*A21B 1/48* (2006.01)

(52) U.S. Cl.
CPC . *A21B 3/02* (2013.01); *A21B 1/48* (2013.01)

(58) Field of Classification Search
CPC .. A21B 3/02; A21B 1/48; E06B 5/162; E06B 5/164; E06B 5/00; E06B 1/60
See application file for complete search history.

(56) References Cited

U.S. PATENT DOCUMENTS

| | | | | |
|---|---|---|---|---|
| 3,327,701 A | * | 6/1967 | Smith | F24C 15/023 |
| | | | | 126/194 |
| 4,021,968 A | * | 5/1977 | Kendall | E05D 11/105 |
| | | | | 49/386 |
| 8,042,533 B2 | * | 10/2011 | Dobie | A21B 1/245 |
| | | | | 126/21 A |
| 2010/0058936 A1 | * | 3/2010 | Schjerven, Sr. | A21B 1/245 |
| | | | | 99/443 C |
| 2011/0269085 A1 | * | 11/2011 | Wiker | A21B 1/48 |
| | | | | 432/4 |

* cited by examiner

*Primary Examiner* — Alfred Basichas
(74) *Attorney, Agent, or Firm* — Kenneth H. Jack; Davis & Jack, LLC

(57) ABSTRACT

A conveyor oven including a baking case having front, longitudinal, and oppositely longitudinal walls, the baking case having longitudinal, oppositely longitudinal, and front ports wherein the front port has a longitudinal end and a rectangular periphery; a conveyor extending through the baking case; a mounting land extending along the front port's periphery; a conveyor access door fitted for covering the front port; a first pin and socket hinge operatively interconnecting the front wall and the longitudinal end of the conveyor access door, the hinge's socket having a rearward opening and further opening oppositely longitudinally; the oven further including a deformable seal positioned between the conveyor access door and the land, the seal being adapted for, upon positioning of the pin at the rearward opening, forwardly biasing the door and the pin, and forwardly seating said pin within the socket.

9 Claims, 10 Drawing Sheets

CONVEYOR OVEN

FIELD OF THE INVENTION

This invention relates to conveyor ovens or tunnel ovens. More particularly, this invention relates to conveyor or tunnel ovens which are specially adapted to include a front wall conveyor access door.

BACKGROUND OF THE INVENTION

Tunnel configured air impingement conveyor ovens are commonly shipped from the manufacturer to a purchasing customer upon a shipping pallet with the oven resting with its back wall upon the pallet. In such shipping configuration, the oven's case and front wall extend upwardly. Where such ovens include a front pivoting conveyor access door or "sandwich door", and where the oven is shipped with such door attached, the door's handle commonly protrudes upwardly from the oven during shipping, undesirably exposing the handle to damage.

In order to eliminate such upward sandwich door handle protrusion, and in order to reduce the risk of handle damage during shipping, it is desirable to configure such sandwich doors to be easily detachable for purposes of reduction of the risk of damage during shipping, and to be easily attachable by the purchasing customer following receipt from shipping. Customer effected attachments and detachments of such sandwich doors are also desirably facilitated in order to allow the customer to easily clean and maintain such sandwich doors.

The instant inventive conveyor oven provides a conveyor access sandwich door which is specially configured for ease of attachment and detachment of the door, such configuration incorporating features which facilitate secure pivoting function of the door during cooking use and facilitate ease of release and re-assembly of the door's pivot mounts.

BRIEF SUMMARY OF THE INVENTION

A first structural component of the instant inventive conveyor oven comprises a baking case having a front wall, a longitudinal wall, and an oppositely longitudinal wall. In the preferred embodiment, the baking case is opened by a longitudinal food passage port and an oppositely longitudinal food passage port, and the case incorporates a continuous loop grate type food conveyor which extends through the case and through the longitudinal and oppositely longitudinal ports. In the preferred embodiment, the inventive conveyor oven further includes a front port or conveyor access opening which is preferably configured as a longitudinally oblongated rectangle having a rectangular periphery.

A further structural component of the instant inventive conveyor oven comprises an oven seal mounting land which extends along and defines the front port's rectangular periphery.

A further structural component of the instant inventive conveyor oven comprises a pivoting or hinged conveyor access door or "sandwich" door, such door having longitudinal and oppositely longitudinal ends and being configured rectangularly in a manner closely fitted for covering the front port.

A further structural component of the instant inventive conveyor oven comprises at least a first pin and socket hinge combination which operatively interconnects the longitudinal end of the sandwich door and the front wall. Preferably, such hinge's pin attaches to and extends longitudinally from the longitudinal edge or end of the sandwich door. In the preferred embodiment, such hinge's socket includes or defines a rearwardly opening pin insertion and extraction slot. Such hinge's socket preferably further opens in the oppositely longitudinal direction for pin receipt and retention, and comprises a forward pin seating surface or face which is arcuately curved and is rearwardly concave. The concave face of such socket functions as a rotary bearing surface.

A further structural component of the instant inventive conveyor oven comprises a tubularly configured deformable seal which is securely attached to the mounting land, such seal extending around the periphery of the front port. In the preferred embodiment, the deformable seal is of the type having a heat resistant fabric outer covering, and incorporating an internal spring steel lattice.

The deformable seal component is preferably adapted for treating the sandwich door and its attached pivot pin as a moveable workpiece. Upon a performance of door installation steps including manually moving the pivot pin to a position rearwardly overlying the rearward opening of the hinge's socket, the deformable seal advantageously forwardly biases the door for forwardly seating the pin within the socket's arcuately curved bearing surface or seat.

Accordingly, the invention's deformable seal component dually functions for prevention of heat losses at the periphery of the sandwich door, and for securely seating the door's longitudinal hinge pin in order to assure smooth pivoting motion of the door. Ease of installation and deinstallation of the pivot pin is facilitated by the rearwardly opening pin access slot. However, the presence of such slot may undesirably allow the pin to travel and drift rearwardly away from its forward rotary bearing seat. Under the function of the instant invention, the rearwardly overlying seal additionally operates as a forwardly biasing spring which bears against the sandwich door in order to resist such undesirable rearward pin travel.

In operation of the instant invention, the forward slot or opening of the first pin and socket joint's socket facilitates ease of attachment and detachment of the sandwich door while the sandwich door's peripheral seal component dually functions as an oven seal and as a hinge pin seating spring.

Accordingly, objects of the instant invention include the provision of a conveyor oven which incorporates structures as described above, and which arranges those structures in manners described above for the achievement of beneficial functions described above.

Other and further objects, benefits, and advantages of the instant invention will become known to those skilled in the art upon review of the Detailed Description which follows, and upon review of the appended drawings.

DETAILED DESCRIPTION OF A PREFERRED EMBODIMENT

Figure 1:
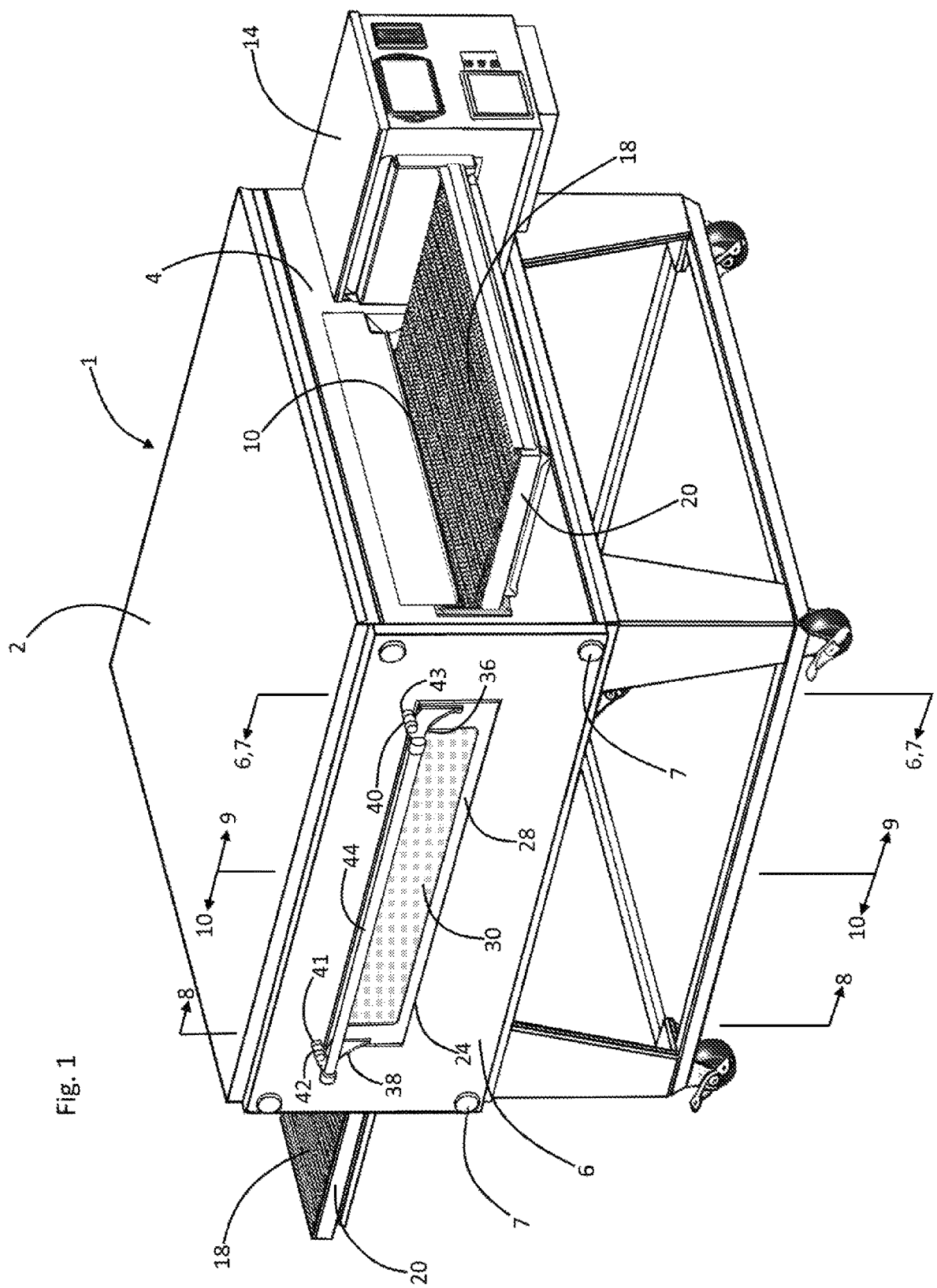
FIG. 1 is a perspective view of the instant inventive conveyor oven.
Figure 2:
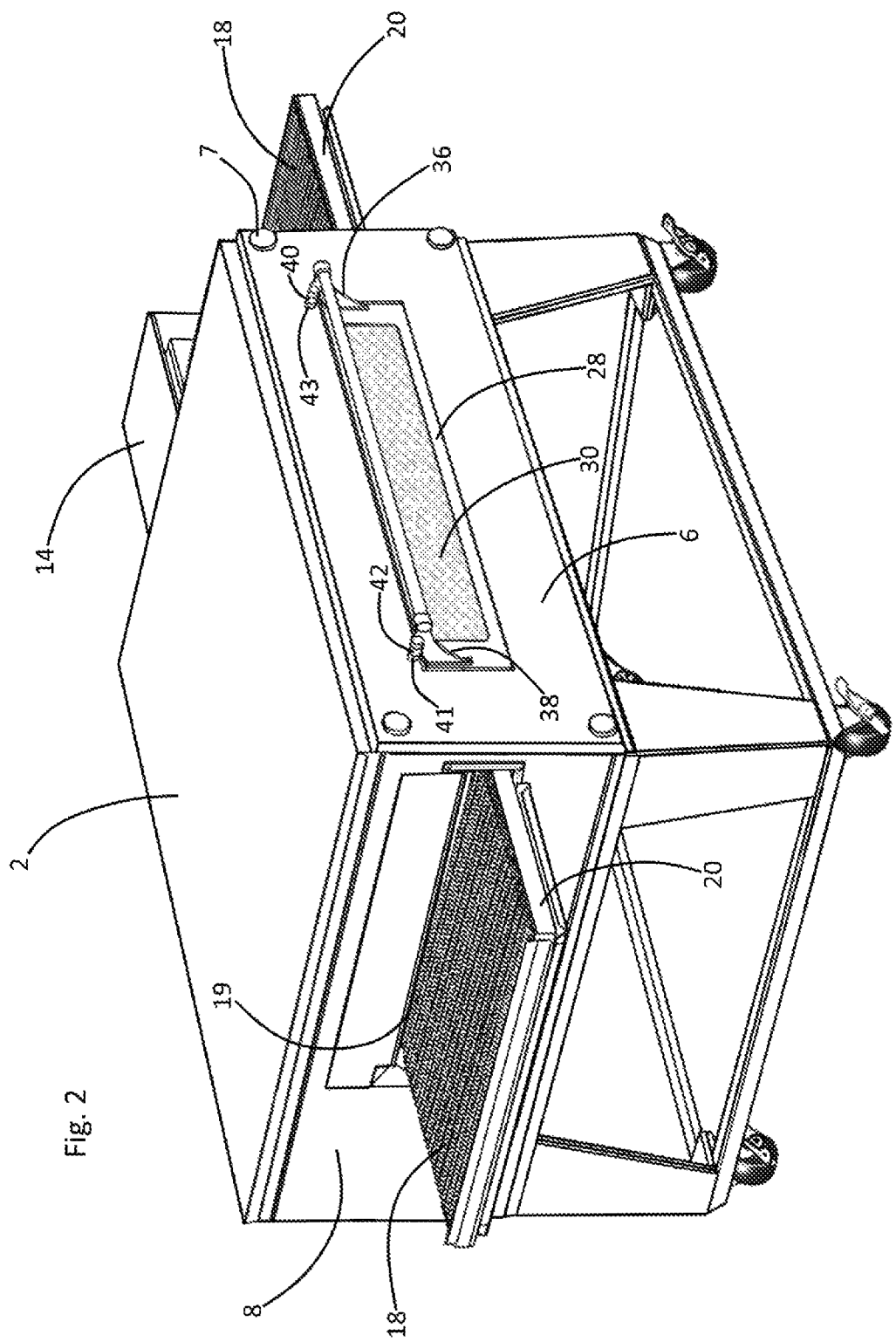
FIG. 2 redepicts the oven of FIG. 1, the view of FIG. 2 showing the oven in an alternative perspective view.
Figure 3:
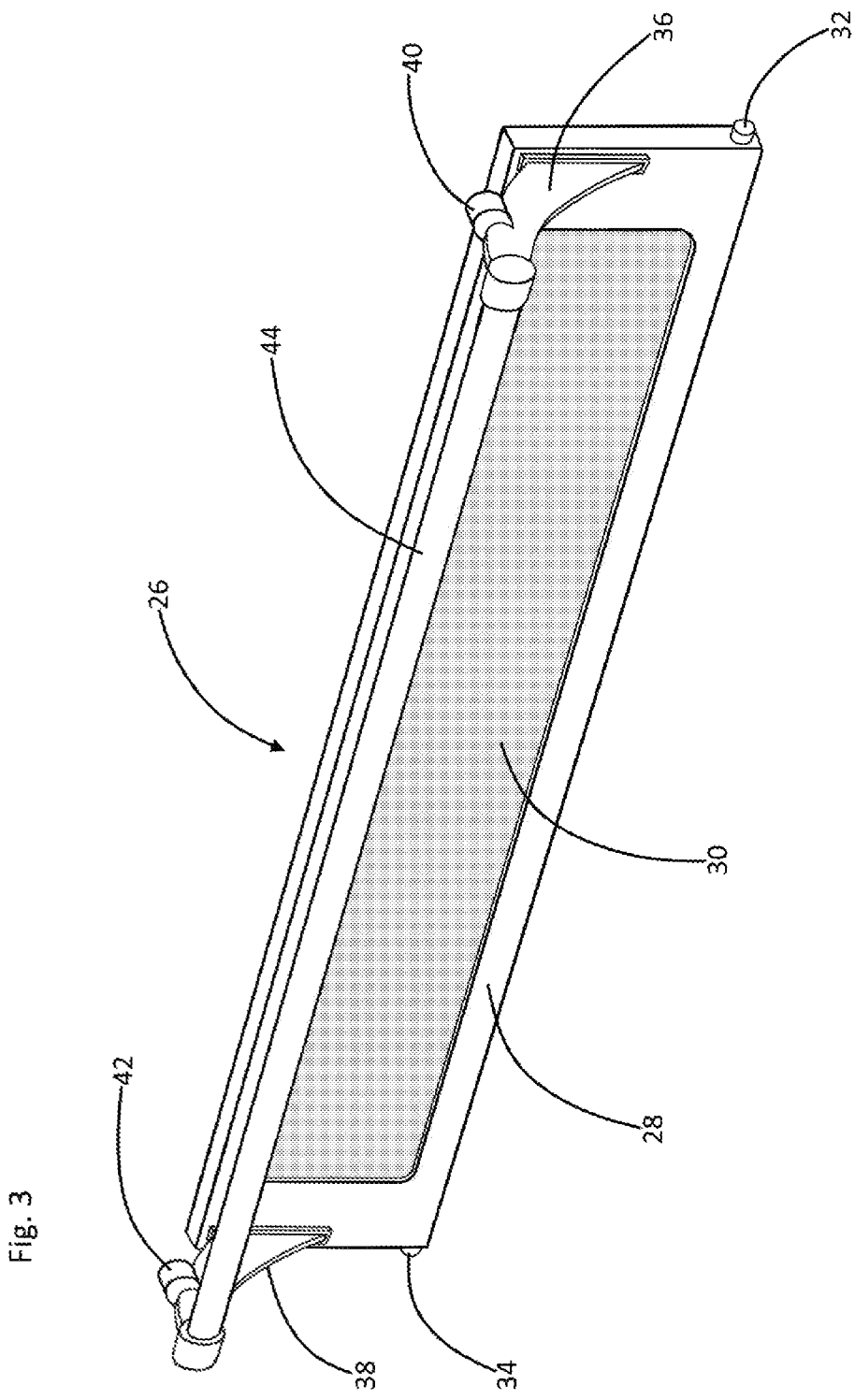
FIG. 3 is a perspective view of a conveyor access door component of the oven of FIG. 1, the view of FIG. 3 showing such door removed for shipping or for cleaning.
Figure 4:
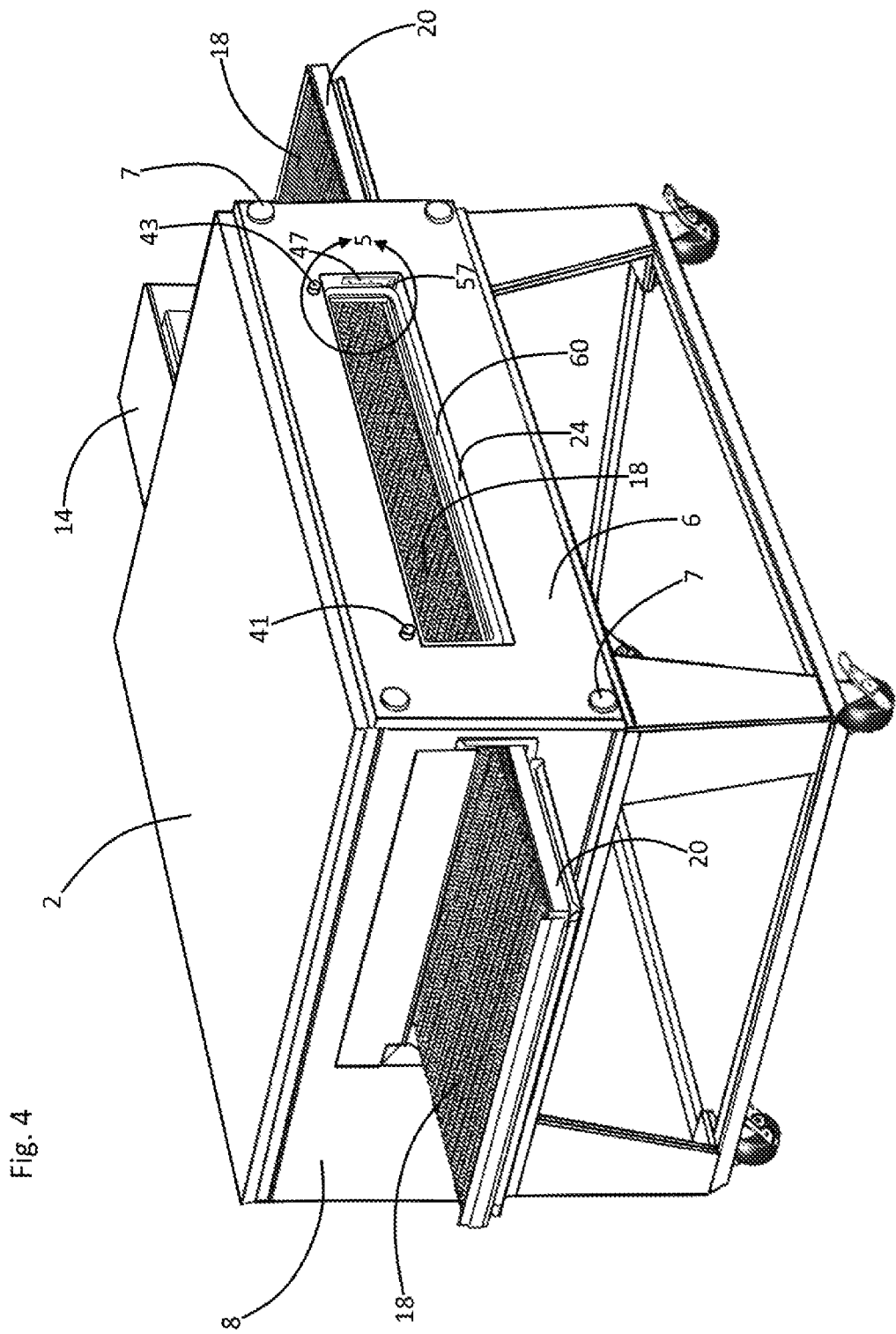
FIG. 4 redepicts the structure of FIG. 2, the view of FIG. 4 showing the conveyor access door of FIG. 3 removed.
Figure 5:
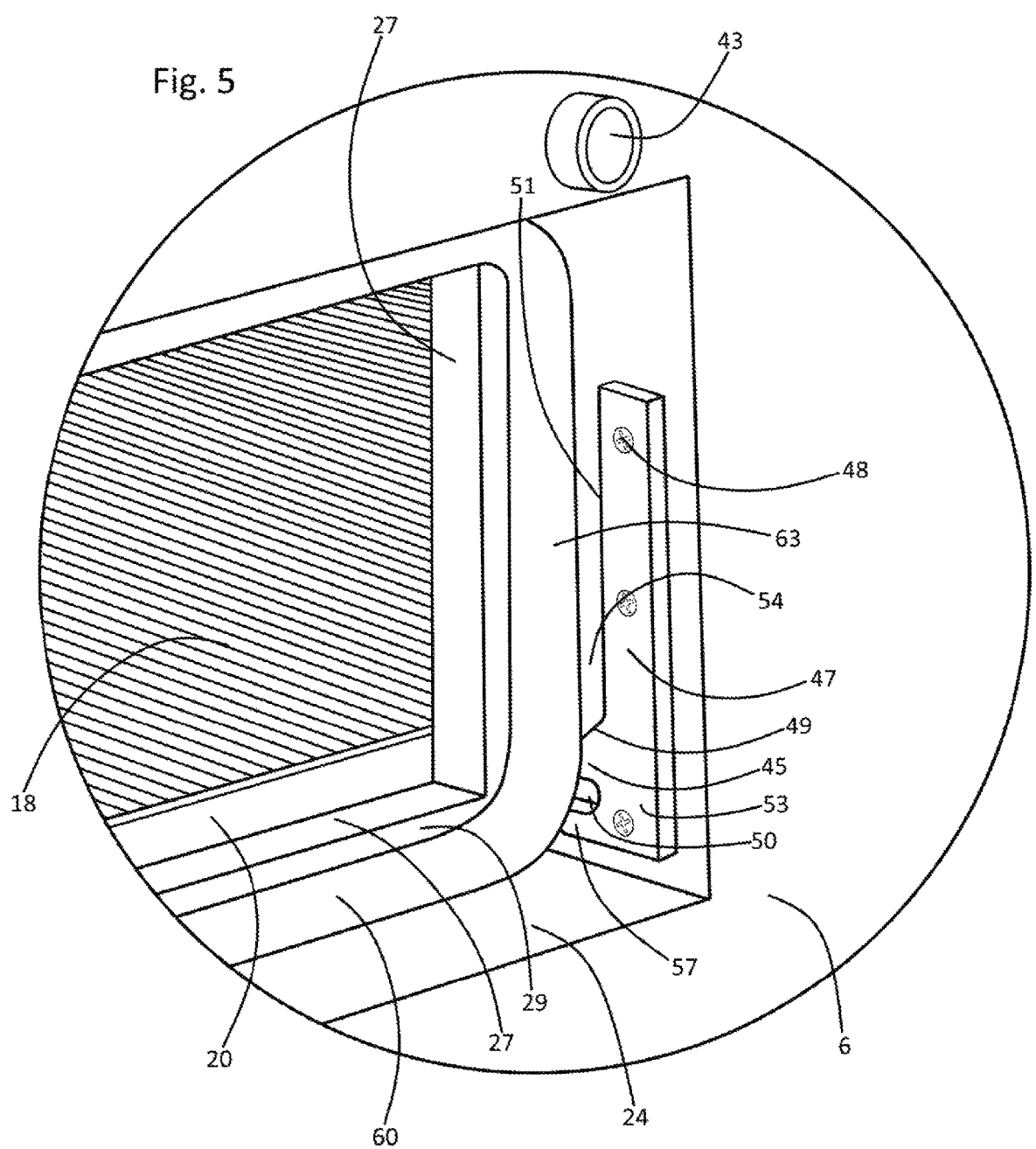
FIG. 5 is a magnified partial view of the structure of FIG. 4, as indicated in FIG. 4.

Referring now to the drawings, and in particular to Drawing FIGS. 1-5, a preferred embodiment of the instant inventive conveyor oven is referred to generally by Reference Arrow 1. The oven 1 typically has an upper wall or ceiling 2, a longitudinal wall 4, an oppositely longitudinal wall 8, and a front wall 6 which is commonly configured as a removable panel attached by screw knobs 7. The oven's case component further has a lower wall or floor opposite its ceiling 2, and has a rear wall opposite front wall panel 6. Longitudinal food passage ports 10 and 19 respectively open the case at the longitudinal and oppositely longitudinal walls 4 and 8, and a continuous loop conveyor frame 20 and grate-type conveyor 18 extend through the interior of the case with opposite ends protruding from food passage ports 10 and 19.

Figure 6:
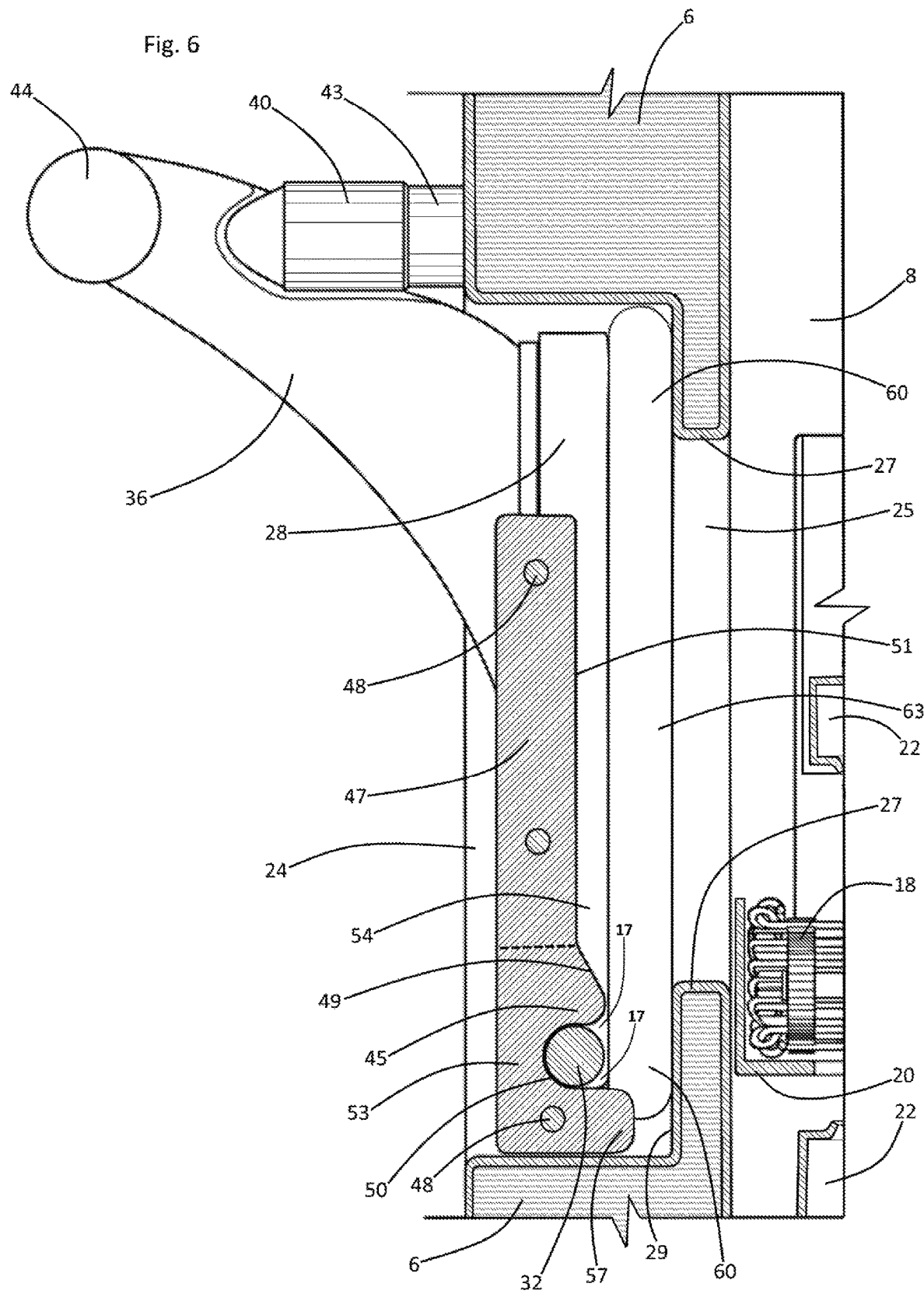
FIG. 6 is a partial sectional view, as indicated in FIG. 1.

Referring further to FIG. 6, upper and lower air impingement finger ducts 22 overlie and underlie the conveyor 18 for jetting heated baking air onto the surfaces of food items such as pizzas for reduction of baking time. An electric motor for cycling the conveyor 18, along with other oven control components are housed within control housing 14.

A rectangularly configured conveyor access port or front port 24,25 opens the case at its front end, such port 24,25 allowing a user of the inventive oven to alternatively insert and extract food items such as sandwiches at midpoints along the grate surface of conveyor 18. A flange 27 extends around the periphery of the front port 24,25, such flange presenting a forwardly facing land 29 which correspondingly extends about the port's periphery. Land 29 preferably comprises a mounting surface for attachment of a seal 60 as described below.

Figure 9:
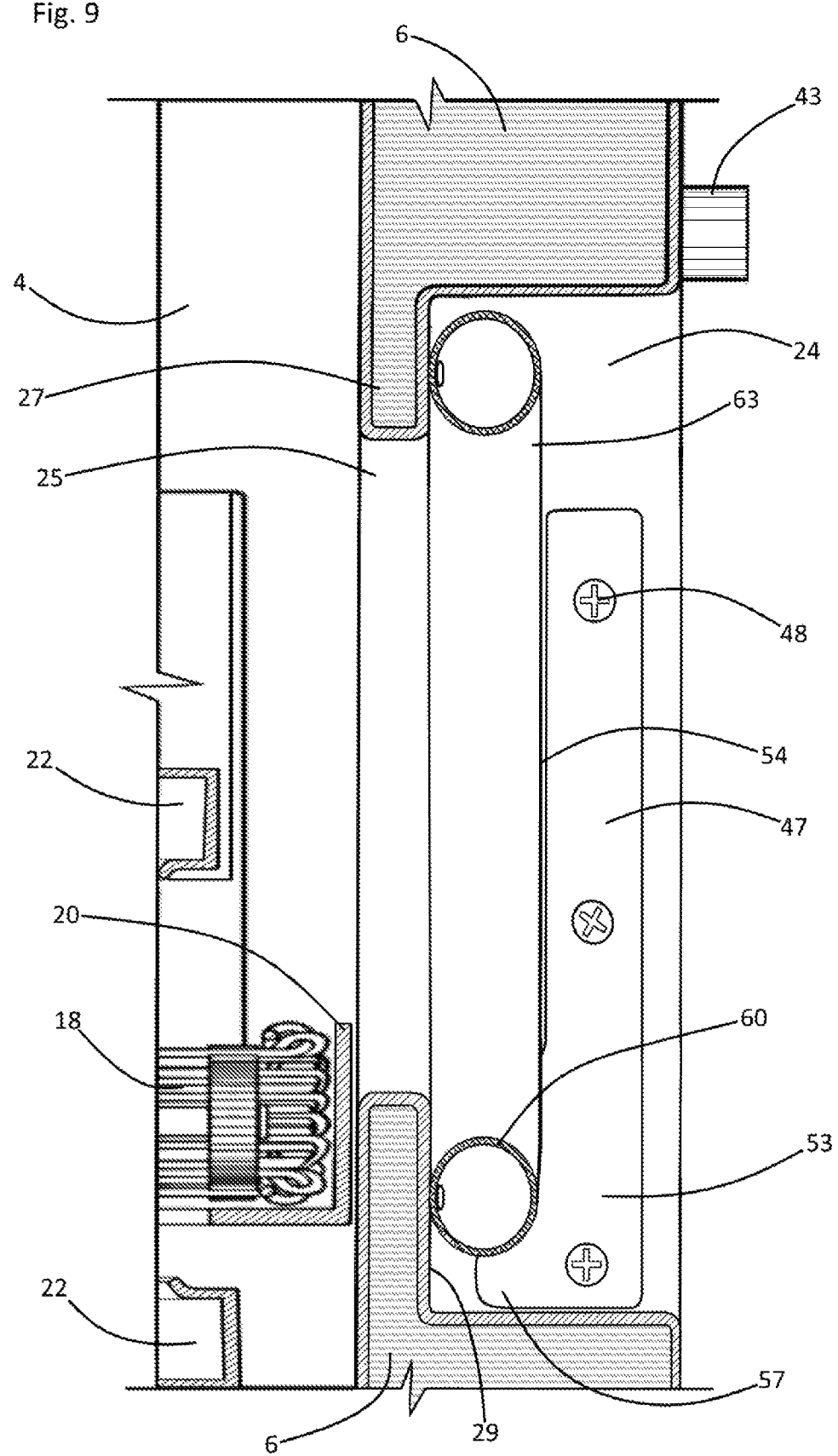
FIG. 9 is a further alternative partial sectional view, as indicated in FIG. 1.
Figure 10:
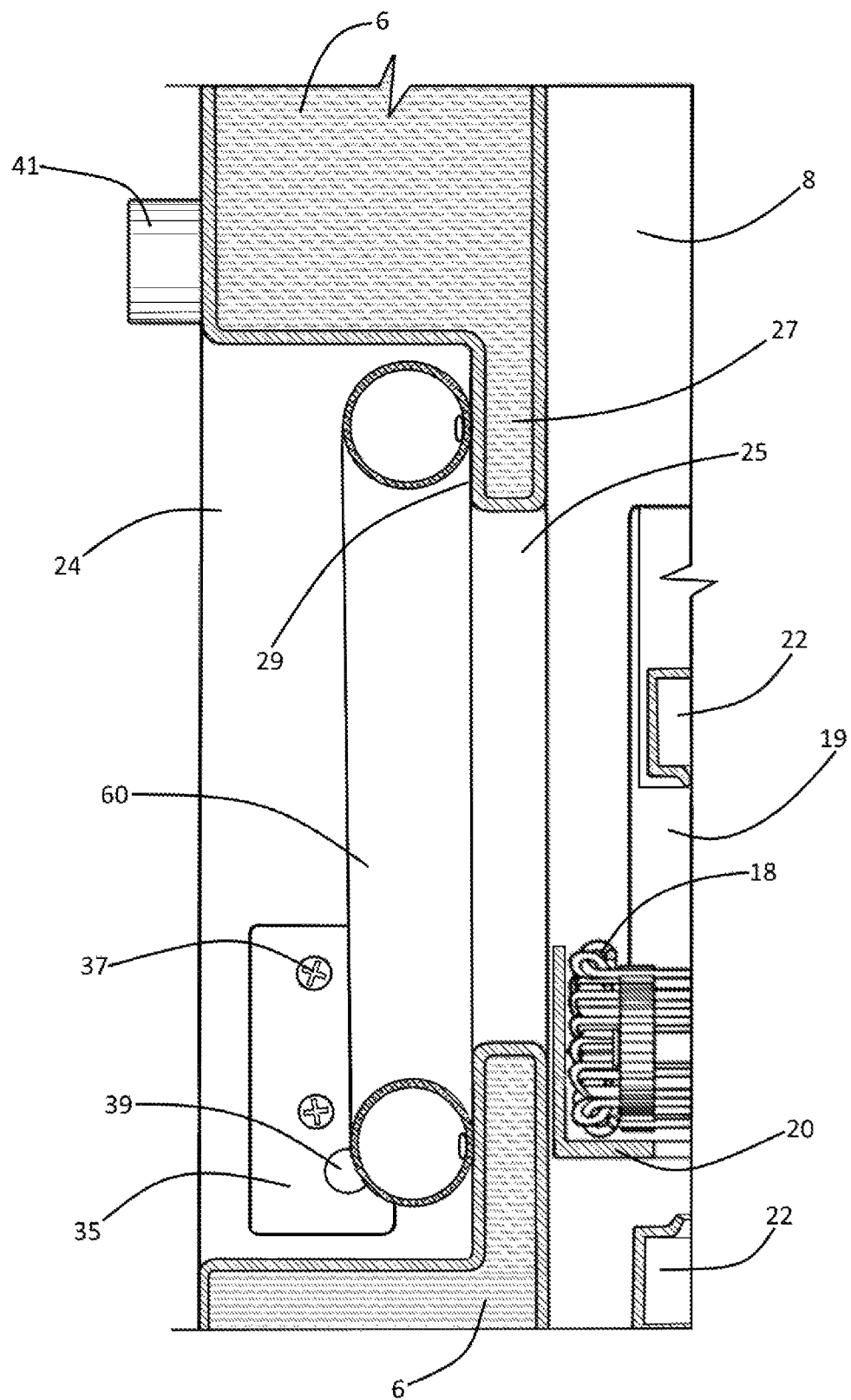
FIG. 10 is a further alternative partial sectional view, as indicated in FIG. 1.

The seal 60 preferably comprises a tubularly configured and deformable oven seal element which is preferably fixedly mounted to the front face of land 29, such seal 60 preferably being of the type which includes a heat resistant exterior covering and includes an interior spring steel wire matrix or lattice. Suitably, though less desirably, the seal 60 may alternatively be fixedly attached to a sandwich door element 28, such door being described below. The spring steel lattice of the seal 60 normally deflects the front face of the seal 60 forwardly to the position and configuration depicted in FIG. 9. Alternatively, referring to FIG. 6, the seal 60 obturates rearwardly upon rearward compression by an object such as, for example, the rearward face of the sandwich door 28, such door having a view window 30. Upon such compression, the seal 60 deforms or obturates to the configuration depicted in FIG. 6.

In the obturated configuration of FIG. 6, the seal 60 continuously biases frontwardly, forcefully pressing its frontal surfaces against the rearward face of the sandwich door 28. Such compressive contact advantageously prevents heated gasses within the baking case from escaping at the peripheral seam between the front port 24,25, and the conveyor access door 28.

A further structural component of the instant inventive conveyor oven comprises at least a first pin and socket hinge which operatively interconnects the longitudinal end of the sandwich door 28 and the front wall 6. Referring in particular to FIG. 6, the invention's first pin and socket hinge component preferably comprises a specialized socket 50 which presents a rearward access slot or rearward opening 17. In order to facilitate nesting receipt of the longitudinal extension of pivot pin 32 of the sandwich door 28, such socket 50 further opens in the oppositely longitudinal direction.

Referring in particular to FIG. 6, the rearward face of the sandwich door 28 may be further pressed rearwardly against the front face of the longitudinal end 63 of the seal 60, such pressure further obturating the seal. Such additional pressure actuated obturation advantageously allows the hinge's pivot pin 32 to travel to a location immediately rearwardly from the rearward opening 17 of socket 50. Upon such pin positioning and upon a release of the rearwardly directed pressure against the sandwich door 28, the spring character of the seal 60 automatically and advantageously forward deflects the sandwich door, and forwardly drives the pivot pin 32 to its seated position within socket 50. In the FIG. 6 configuration, the seal 60 continuously presses pivot pin 32 into such seated and rotary bearing functioning position, advantageously allowing smooth pivoting operation of the sandwich door 28.

In a preferred embodiment, the instant inventive oven comprises a "C" plate component 53 which is attached by mounting screws 48 to the front wall 6, such mount being positioned at the longitudinal end of the front port 24,25. The "C" plate 53 preferably includes upper and lower arms 45 and 57 which define and bound the rearward opening of the socket 50.

The instant inventive oven preferably further comprises a plate extension component 47 which is fixedly attached to or formed wholly with the "C" plate 53, such attachment residing at the dashed line drawn in FIG. 6 upon such plate. In the preferred embodiment, the plate extension component 47 has a rear wall or edge 51 which, in combination with the front surface of the longitudinal end 63 of the tubular seal 60, forms and defines a vertically extending pin guide slot 54. In the preferred embodiment, the rear wall 51 of the plate extension 47 (which also constitutes the front wall of the pin guide slot 54) is displaced frontwardly from the rearward end of the upper arm 45 of the "C" plate 53. Such frontward displacement of wall 51 advantageously allows pin 32 to be inserted into and manually moved downwardly along the pin guide slot 54 with a lessened amount of rearward deflection of the deformable seal 60. Accordingly, the frontward deflection of the plate extension wall 51 with respect to the rear end of the upper arm 45 advantageously eases and facilitates the user performed step of manually positioning the pin 32 at the forward opening 17 of the "C" plate 53. An angled transition 49 extending between wall 51 and the rearward end of "C" arm 45 further facilitates such pin positioning.

The instant inventive conveyor oven preferably further comprises a second pin and socket hinge which operatively interconnects the sandwich door 28 and the front wall 6, such second pin and socket hinge being positioned at the oppositely longitudinal ends of such door and of the front port 24,25. In a preferred embodiment, the second pin and socket hinge comprises a combination of a second pivot pin 34 which extends oppositely longitudinally from the lower end of the oppositely longitudinal edge of the sandwich door 28 and an eyed plate 35. Such plate 35 preferably includes a socket or eye 39 which is closely fitted for receiving pin 34. Such plate is preferably mounted by screws 37 to the oppositely longitudinal end wall of port 24.

In operation of the instant inventive conveyor oven, referring simultaneously to FIGS. 1, 3, 6, and 10, the sandwich door 28 may be initially closed as indicated in FIG. 6. In such configuration, the receipt of the oppositely longitudinally extending pivot pin 34 within socket 39 in combination with the spring biased captured pin 32 within socket 50 effectively resists the continuous forward pressure exerted by the seal 60 against the lower end of the sandwich door 28. Correspondingly, magnets 40 and 42 (mounted to handle 36,38,40) which are in magnetic contact with case mounted magnets 41 and 43 resist the forward pressure exerted by the upper end of the seal 60 against the upper end of the sandwich door 28. Thus, the lower pin and socket joints 32,50,34,39, and upper magnets 40,43,41,42, hold the door 28 at its seal compressing closed position.

Figure 7:
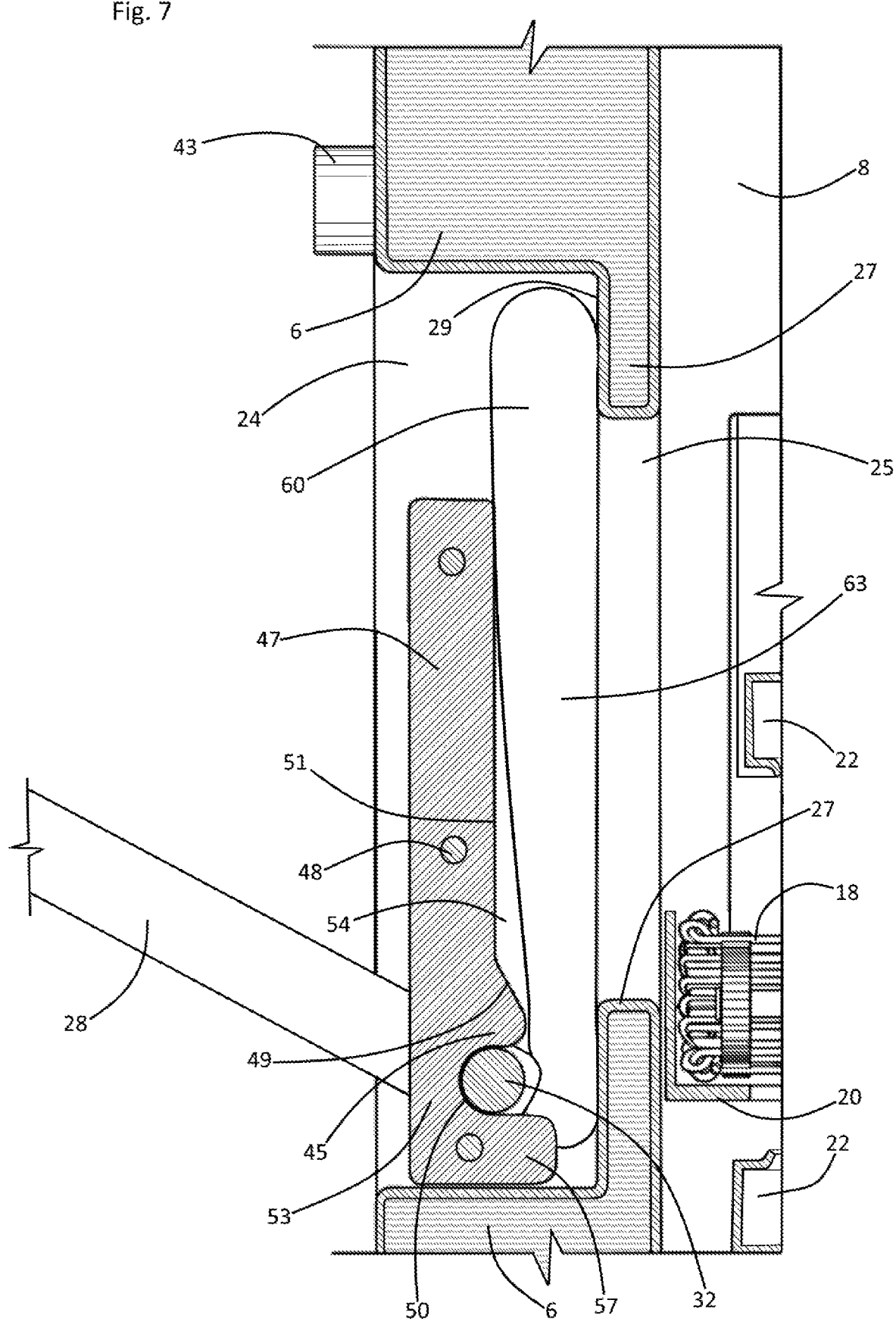
FIG. 7 redepicts the structure of FIG. 6, the view of FIG. 7 showing a conveyor access door component forwardly pivoted.
Figure 8:
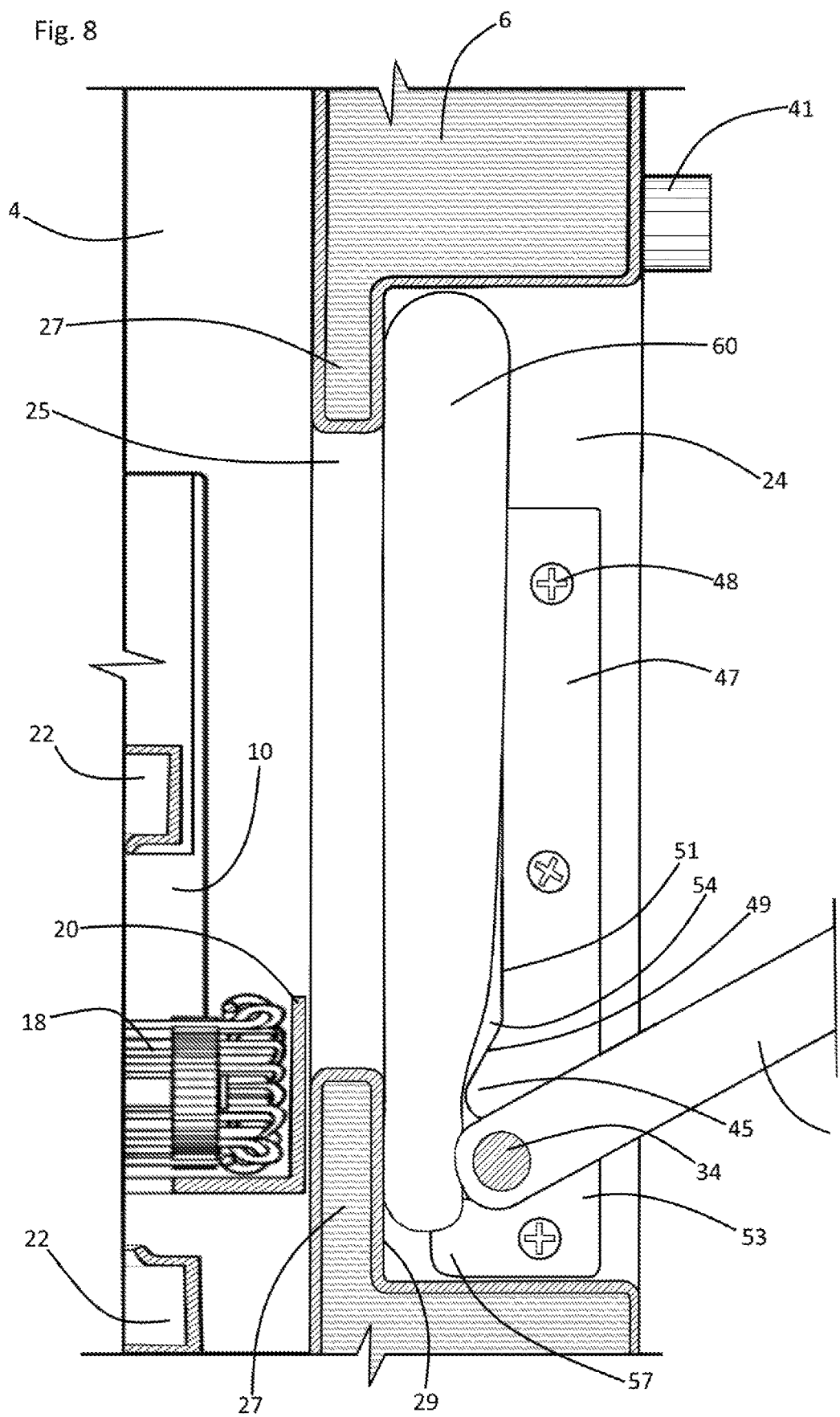
FIG. 8 is an alternative partial sectional view, as indicated in FIG. 1.

In order to deinstall the sandwich door, an operator may initially grasp handle 44 and may pull rearwardly thereon. Such pulling force separates magnets 40 and 42 from the case mounted magnets 43 and 41, allowing the sandwich door to pivot about its pivot pins 32 and 34 within their sockets 50 and 39. As indicated in FIG. 7, during such pivoting motion, the lower end of the deformable seal 60 forwardly drives against the lower end of the sandwich door in order to continuously seat the pivot pin 32 within the rearwardly opening socket 50.

Following such pivoting opening of the sandwich door 28, the operator may press forwardly upon the longitudinal end of handle 44 and/or door 28, such pressure driving the lower end of the longitudinal end of the sandwich door 28 against the lower end of the longitudinal end 63 of the deformable seal 60. Such driving pressure effectively moves the pivot pin 32 rearwardly along slot opening 17 until the frontward aspect of such pivot pin resides slightly rearwardly from the rearward end of the "C" plate's upper arm 45.

Thereafter, the operator while continuing to apply such rearward pressure, may simultaneously upwardly move the door's longitudinal end in order to draw the pivot pin 32 upwardly and around the curved end of the upper arm 45. Thereafter, the forward pressure may be released, allowing the forward driving pressure of the seal 60 against the door to slide pivot pin 32 upwardly and forwardly along the angled transition 49 to enter the lower end of the pin travel slot 54.

Thereafter, the operator may easily slidably move the longitudinal end of the sandwich door and its pivot pin 32 upwardly along the travel slot 54 until such pin reaches the extreme upper end of the plate extension 47.

Thereafter, the operator may easily and conveniently pivot the longitudinal end of the sandwich door frontwardly until the entire door may be moved longitudinally, effectively extracting the oppositely longitudinal pivot pin 34 from its socket 39.

A reversal of steps described above easily and conveniently reinstalls the sandwich door 28 within the port opening 24,25.

While the oppositely longitudinal plate 35 may suitably be alternatively configured as an oppositely longitudinal mirror image of "C" plate 53 and extension plate 47, the oppositely longitudinal plate is preferably configured as indicated to present a circularly enclosing pin capturing eye 39. Such preferred embodiment assures that the hand actuated pin sliding installation steps described above may occur exclusively at one end of the sandwich door, while the opposite end pin 34 remains securely captured within the closed socket 39. In order to further ergonomically enhance the instant inventive oven, it may be recognized that between 75% and 95% of operators will be right-handed. Correspondingly, the longitudinal ends of the sandwich door 28 and the front port 24,25 may constitute the rightward ends of those structures. Such orientation advantageously allows right-handed operators to use their right hands to perform the more complicated installation and deinstallation steps of pin insertion, pin sliding, and pin seating and unseating.

While the principles of the invention have been made clear in the above illustrative embodiment, those skilled in the art may make modifications to the structure, arrangement, portions and components of the invention without departing from those principles. Accordingly, it is intended that the description and drawings be interpreted as illustrative and not in the limiting sense, and that the invention be given a scope commensurate with the appended claims.

The invention hereby claimed is:

1. A conveyor oven comprising:
(a) a baking case having a front wall, a longitudinal wall, and an oppositely longitudinal wall, the baking case being opened by a longitudinal port, an oppositely longitudinal port, and a front port, the front port having a longitudinal end, an oppositely longitudinal end, and a rectangular periphery;
(b) a continuous loop conveyor extending through the baking case and through the longitudinal and oppositely longitudinal ports;
(c) a land extending along the front port's rectangular periphery;
(d) a conveyor access door having longitudinal and oppositely longitudinal ends, the door being fitted for covering the front port;
(e) a first pin and socket hinge, the pin and socket hinge comprising a longitudinally extending pin and a socket, the pin and socket hinge operatively interconnecting the longitudinal end of the conveyor access door and the front wall, the socket opening oppositely longitudinally and having a rearward opening; and
(f) a deformable seal between the conveyor access door and the land, the deformable seal incorporating a spring for, upon positioning the pin at the socket's rearward opening, forwardly biasing the conveyor access door and forwardly seating the pin within the socket.

2. A conveyor oven comprising:
(a) a baking case having a front wall, a longitudinal wall, and an oppositely longitudinal wall, the baking case being opened by a longitudinal port, an oppositely longitudinal port, and a front port, the front port having a longitudinal end, an oppositely longitudinal end, and a rectangular periphery;
(b) a continuous loop conveyor extending through the baking case and through the longitudinal and oppositely longitudinal ports;
(c) a land extending along the front port's rectangular periphery;
(d) a conveyor access door having longitudinal and oppositely longitudinal ends, the door being fitted for covering the front port;
(e) a first pin and socket hinge, the pin and socket hinge comprising a longitudinally extending pin and a socket, the pin and socket hinge operatively interconnecting the longitudinal end of the conveyor access door and the front wall, the socket opening oppositely longitudinally and having a rearward opening;

(f) a deformable seal between the conveyor access door and the land, the deformable seal incorporating a spring for, upon positioning the pin at the socket's rearward opening, forwardly biasing the conveyor access door and forwardly seating the pin within the socket; and (g) a "C" plate having upper and lower arms, the first pin and socket hinge's socket being bounded by the upper and lower arms, wherein the "C" plate is fixedly attached to the front wall and is positioned at the front port's longitudinal end.

3. The conveyor oven of claim 2 comprising a plate extension having a rear wall, the plate extension being fixedly attached to and extending upwardly from the "C" plate, and further comprising a pin guide slot having a front wall, said front wall comprising the plate extension's rear wall.

4. The conveyor oven of claim 3 wherein the deformable seal has a longitudinal end, wherein the pin guide slot has a rear wall, and wherein said rear wall comprises the deformable seal's longitudinal end.

5. The conveyor oven of claim 4 wherein the "C" plate's upper arm has a rearward end, and wherein the pin guide slot's front wall is displaced frontwardly from said upper arm's rearward end.

6. The conveyor oven of claim 5 further comprising an angled transition spanning between the pin guide slot's front wall and the rearward end of the "C" plate's upper arm.

7. The conveyor oven of claim 6 further comprising a second pin and socket hinge operatively interconnecting the front wall and the conveyor access door, the second pin and socket hinge being positioned at the oppositely longitudinal end of the conveyor access door.

8. The conveyor oven of claim 7 wherein the conveyor access door's longitudinal and oppositely longitudinal ends have lower ends, and wherein the first and second pin and socket hinges' pins are respectively positioned at said lower ends.

9. The conveyor oven of claim 8 further comprising an eye plate fixedly attached to the front wall and positioned at the oppositely longitudinal end of the front port, wherein the second pin and socket joint's socket comprises the eye plate.

* * * * *